March 19, 1957  A. A. SHAFER, JR  2,785,513
STAR SEPARATOR FOR TUMBLING MILLS
Filed June 11, 1954  2 Sheets-Sheet 1

INVENTOR.
ALVA ALLEN SHAFER JR.
BY
Patrick D. Beavers
ATTORNEY

March 19, 1957  A. A. SHAFER, JR  2,785,513
STAR SEPARATOR FOR TUMBLING MILLS
Filed June 11, 1954  2 Sheets-Sheet 2
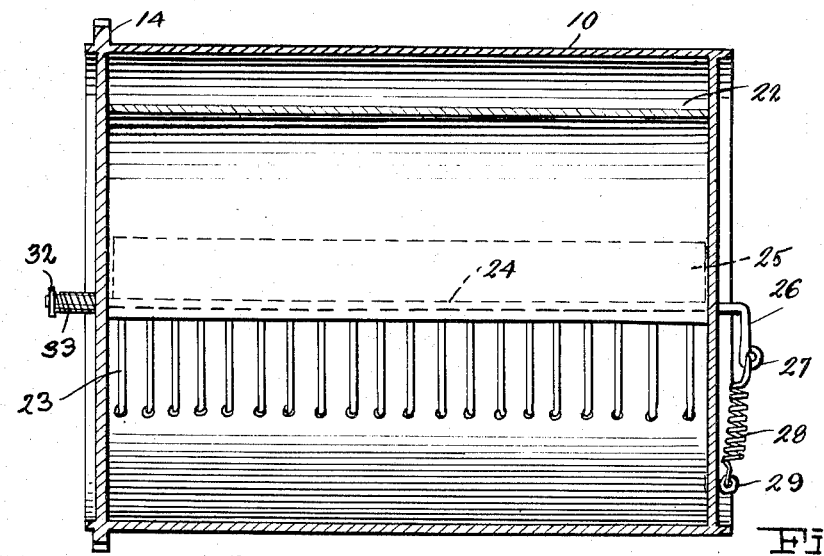
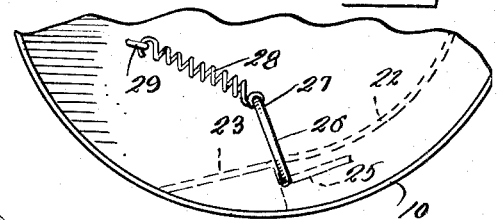
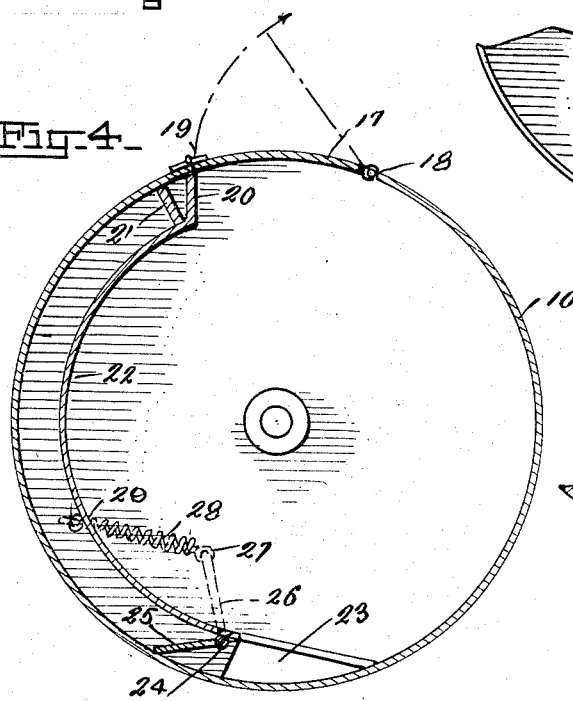
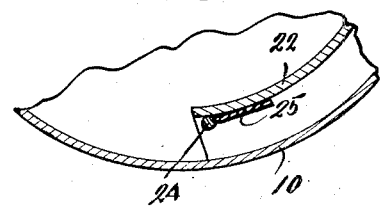
INVENTOR.
ALVA ALLEN SHAFER Jr.
BY
Patrick D. Beavers
ATTORNEY

2,785,513
STAR SEPARATOR FOR TUMBLING MILLS

Alva Allen Shafer, Jr., Danville, Ill.

Application June 11, 1954, Serial No. 435,966

1 Claim. (Cl. 51—164)

This invention relates to improvements in a star separator for tumbling mills.

At the present time most plants that use tumbling mills have such mills located on the floor. After the iron in the tumbling mills has been cleaned by the stars the iron is usually separated from the stars by hand.

An important object of this invention, therefore, is to elevate the mills to make them more readily accessible.

Another important object of the invention is to provide an interliner for the tumbling mills so that upon reversing of the motor the mill will be rotated in the opposite direction and the interliner will function as a scoop shovel for the stars so that the stars will be separated from the iron and the iron can be dumped from the tumbling mill into hoppers.

The use of the interliner will, therefore, save manpower and time in the separating of the stars from the iron, thus permitting more iron to be cleaned in the same length of time that is now required to clean the stars from the iron by hand operation.

With the above and other important objects and advantages in view the invention consists of the novel details of construction, arrangement and combination of parts more fully hereinafter described, claimed and illustrated in the accompanying drawings in which:

Fig. 3 is a longitudinal sectional view on the line 3—3 of Fig. 2;

Fig. 4 is a vertical sectional view on the line 4—4 of Fig. 2;

Fig. 5 is a fragmentary detailed view of the spring biased arm of the trap door of the separator;

Fig. 6 is a fragmentary detailed sectional view of one end of the separator and trap door.

Figure 1:
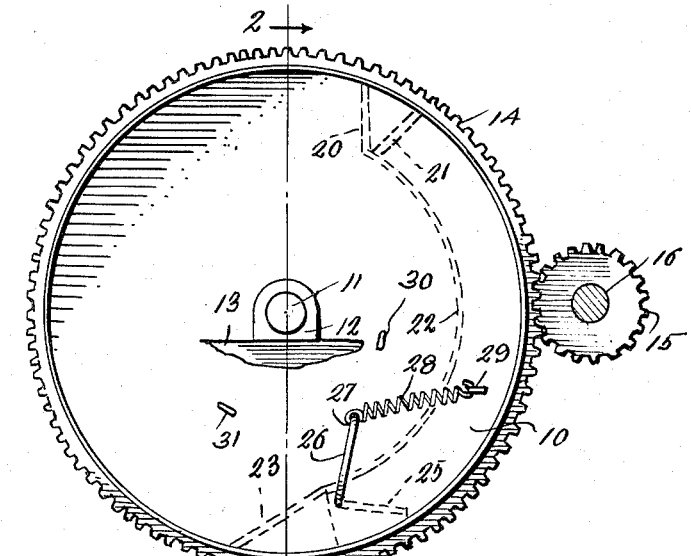
Fig. 1 is an elevational end view of a tumbling mill embodying the invention.
Figure 2:
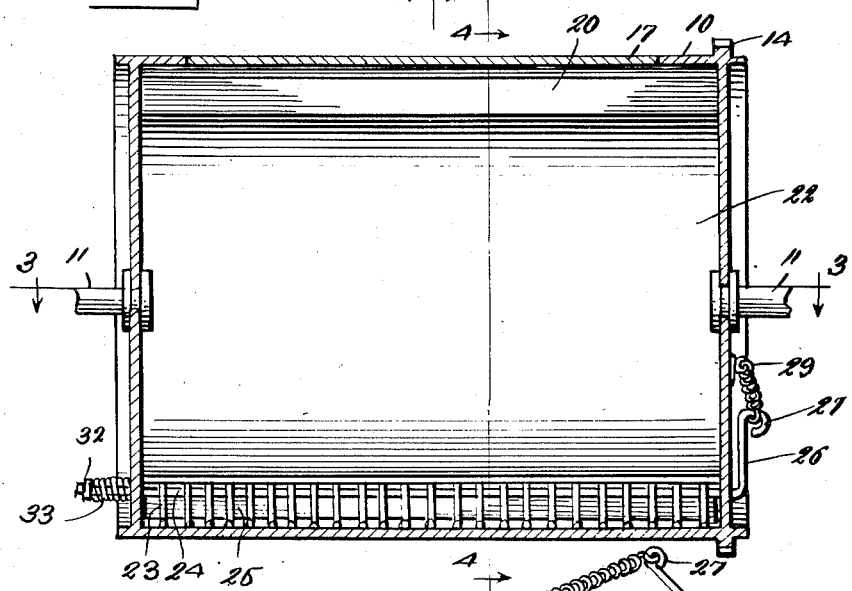
Fig. 2 is a vertical sectional view on the line 2—2 of Fig. 1.

Referring more in detail to the drawings, wherein like parts are designated by like reference numerals, the reference numeral 10 designates a closed drum for the tumbling mill.

The drum 10 is provided at its opposite ends with axles 11 and each axle is journalled in a bearing 12 positioned at each end of the drum. Each bearing is mounted on a support 13 that elevates the drum above the surface of the floor level.

One end of the drum has an annular gear 14 positioned adjacent the periphery of the drum and a drive gear 15 engages the gear 14 for the rotation of the drum in the conventional manner. Power is furnished the gear 15 by means of the axle 16 on which the gear 15 is rigidly mounted.

The wall of the drum 10 is provided with an opening that is closed by an entrance door 17 hinged at 18 to the wall of the drum at one edge of the opening therein and a latch 19 on the wall of the drum on the edge of the opening opposite to the hinged edge of the entrance door maintains the door in closed position during the rotation of the drum.

A narrow elongated plate 20 extends longitudinally of the drum 10 and one longitudinal edge of the plate 20 is secured by welding or the like to the inner surface of the drum adjacent the unhinged edge of the door 17. The plate 20 will also be welded at its ends to the ends of the drum 10. The plate 20 is in angular relation to the inner surface of the drum, as shown in Fig. 4.

An elongated narrow stop plate 21 also extends longitudinally of the drum 10 and is also welded along one longitudinal edge to the inner surface of the drum. The plate 21 is welded adjacent the edge of the plate 20 that is welded to the drum, but it is at right angles to the interior surface of the drum.

An arcuate shaped plate 22 also extends longitudinally of the drum 10. The plate 22 is welded at one longitudinally extending edge to the longitudinal edge of the plate 20, not welded to the inner surface of the drum. The plate 22 is also welded to the longitudinally extending edge of the stop plate 21 not welded to the inner surface of the drum. The plate 22 follows the contour of the drum 10 and is spaced from the inner surface of the drum a distance equal to the width of the plate 21.

A plurality of relatively spaced rods 23 are welded at one end thereof to the longitudinally extending edge of the plate 22 not welded to the plate 20 and the opposite ends of the rods are welded to the interior surface of the drum 10 in parallel relation to each other.

Extending longitudinally of the drum 10 adjacent the longitudinal edge of the plate 22 welded to the rods 23 and rearwardly of the rods 23, is a shaft 24, the ends of which are journalled in the ends of the drum 10.

Figure 7:
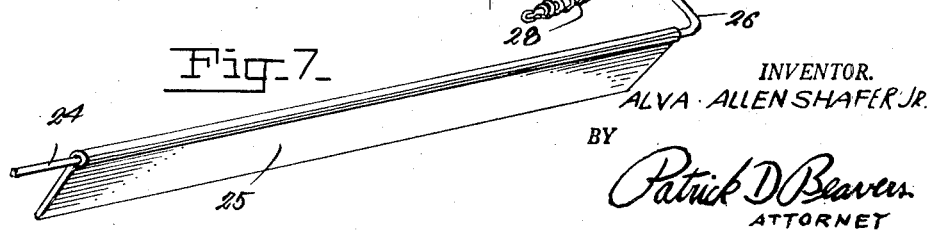
Fig. 7 is a perspective view of the trap door.

Fixed to the shaft 24 within the confines of the drum 10 and rearwardly of the rods 23, is an elongated trap door 25, see Fig. 7, which closes the space between the longitudinal edge of the plate 22 welded to the rods 23 and the interior surface of the wall of the drum 10.

One end of the shaft 24 has a crank arm 26 thereon and an eye 27 on the end of the crank arm 26 receives one end of a spring 28. The other end of the spring 28 is fastened to an eye 29 fixed in the end of the drum 10 and permits the door to swing back and forth as the drum rotates.

A second eye 30 on the end of the drum 10 will engage the end of the spring 28 when it is unhooked from eye 29 and will maintain the trap door in closed position when the trap door is not being used. A third eye 31 will engage the end of the spring 28 when it is not engaged with either eye 29 or eye 30. When the end of the spring is engaged with the eye 31, the trap door 24 will be retained in open position as in Fig. 6.

A collar 52 is fixed to the opposite end of the shaft 24 and a coil spring 33 is interposed on the end of the shaft intermediate the collar and the end of the drum 10. The spring 33 prevents endwise play of the shaft 24 and thus prevents the edges of the trap door from scraping against the interior surface of the ends of the drum 10 during the movement of the trap door in relation to the movement of the drum.

The stars placed in the drum 10 are usually of a size that is smaller than the iron being cleaned. The stars are placed loosely in the drum and the iron then dumped into the drum. As the drum rotates the stars strike the iron to clean the same. The trap door 25, during the operation of the drum, will prevent the stars from entering the space between the interliner and the wall of the drum.

After the iron has been cleaned the rotation of the drum is reversed and the stars will strike the trap door, open the same and then be trapped behind the trap door. When all the stars have been trapped, the entrance door is opened and the iron can be dumped from the drum into storage bins.

The use of the stars is not always required in cleaning the iron and at that time the spring can be hooked so that the trap door will remain closed to trap the stars from entering the drum.

The location of the springs, as to the end attached to the eyes on the end of the drum, is determined by the mill hand and the spring is hooked and unhooked manually as desired.

There has thus been provided a means that will separate the stars from the iron being cleaned by reversing the rotation of the drum and it is believed that the operation and construction of the device will be apparent to those skilled to the art.

In common practice when two inch stars are to be used the rods will be spaced two inches apart and will be made of three-quarter inch alloy steel.

It is also to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

A star separator for a tumbling mill comprising a drum, a stop plate positioned interiorly of said drum and extending longitudinally of said drum and secured at one longitudinal edge thereof to said drum, an arcuate shaped plate positioned interiorly of said drum in parallel spaced relation to the inner face of said drum and secured to the other longitudinal edge of said stop plate, relatively spaced parallel rods secured to the opposite longitudinal edge of said arcuate shaped plate and a trap door swingably mounted in said drum rearwardly of said rods and adapted to trap cleaning stars rearwardly of said arcuate shaped plate.

References Cited in the file of this patent
UNITED STATES PATENTS

| | | |
|---|---|---|
| 2,359,944 | Schummer | Oct. 10, 1944 |
| 2,420,748 | Howard | May 20, 1947 |
| 2,630,301 | Lentz | Mar. 3, 1953 |